(12) United States Patent
Smith

(10) Patent No.: US 7,255,144 B2
(45) Date of Patent: Aug. 14, 2007

(54) GUIDE FOR WORKBENCH

(76) Inventor: Darrin Eugene Smith, c/o Jessem Products Ltd., 124 Big Bay Point Road, Barrie, Ont. (CA) L4N 9B4

( * ) Notice: Subject to any disclaimer, the term of this patent is extended or adjusted under 35 U.S.C. 154(b) by 80 days.

(21) Appl. No.: 10/678,228

(22) Filed: Oct. 6, 2003

(65) Prior Publication Data

US 2004/0065387 A1    Apr. 8, 2004

(30) Foreign Application Priority Data

Oct. 7, 2002    (CA) .................................. 2407368
Aug. 8, 2003   (CA) .................................. 2437157

(51) Int. Cl.
 *B27C 5/04* (2006.01)
 *B27C 5/06* (2006.01)
(52) U.S. Cl. .................... 144/253.6; 144/253.1; 83/435.11; 83/435.12
(58) Field of Classification Search .......... 83/421, 83/435.11–435.19, 412, 418, 419, 425, 431, 83/435.21–435.27, 438, 439, 477.2; 33/534, 33/638; 407/54; 409/182; 144/253.1, 253.6, 144/253.8
See application file for complete search history.

(56) References Cited

U.S. PATENT DOCUMENTS

| | | | | |
|---|---|---|---|---|
| 2,056,552 A | * | 10/1936 | Yerk | 83/751 |
| 2,169,517 A | * | 8/1939 | Biro | 83/448 |
| 2,196,371 A | * | 4/1940 | Berkel | 83/94 |
| 2,237,556 A | * | 4/1941 | Hedgpeth | 33/430 |
| 2,785,709 A | * | 3/1957 | Shepp | 83/435.14 |
| 3,083,744 A | * | 4/1963 | Vold | 33/640 |
| 3,240,244 A | * | 3/1966 | Biro | 83/421 |
| 3,512,563 A | * | 5/1970 | Sorensen | 83/425 |
| 4,485,711 A | * | 12/1984 | Schnell | 83/425 |
| 4,887,653 A | * | 12/1989 | Thomas | 144/286.1 |
| 5,038,486 A | * | 8/1991 | Ducate, Sr. | 33/430 |
| 5,205,198 A | * | 4/1993 | Foray et al. | 83/435.12 |
| 5,662,019 A | * | 9/1997 | Denman | 83/425 |
| 5,735,054 A | * | 4/1998 | Cole | 33/471 |
| 6,688,202 B2 | * | 2/2004 | Parks et al. | 83/435.27 |
| 6,691,423 B2 | * | 2/2004 | Fontaine | 33/640 |

* cited by examiner

*Primary Examiner*—Boyer D. Ashley
*Assistant Examiner*—Carolyn Blake
(74) *Attorney, Agent, or Firm*—Birch, Stewart, Kolasch & Birch, LLP

(57) ABSTRACT

The guide controls the angle of stock on the working surface of a workbench. The guide is slidable along a guide rod and has a rotary element to which a backing block is attached for supporting the stock. The rotary element is provided with a detent which causes the element to move in predetermined increments as it rotates. The guide is rotatable about the guide rod so that it may be swung away from the working surface when the guide is not in use.

17 Claims, 9 Drawing Sheets

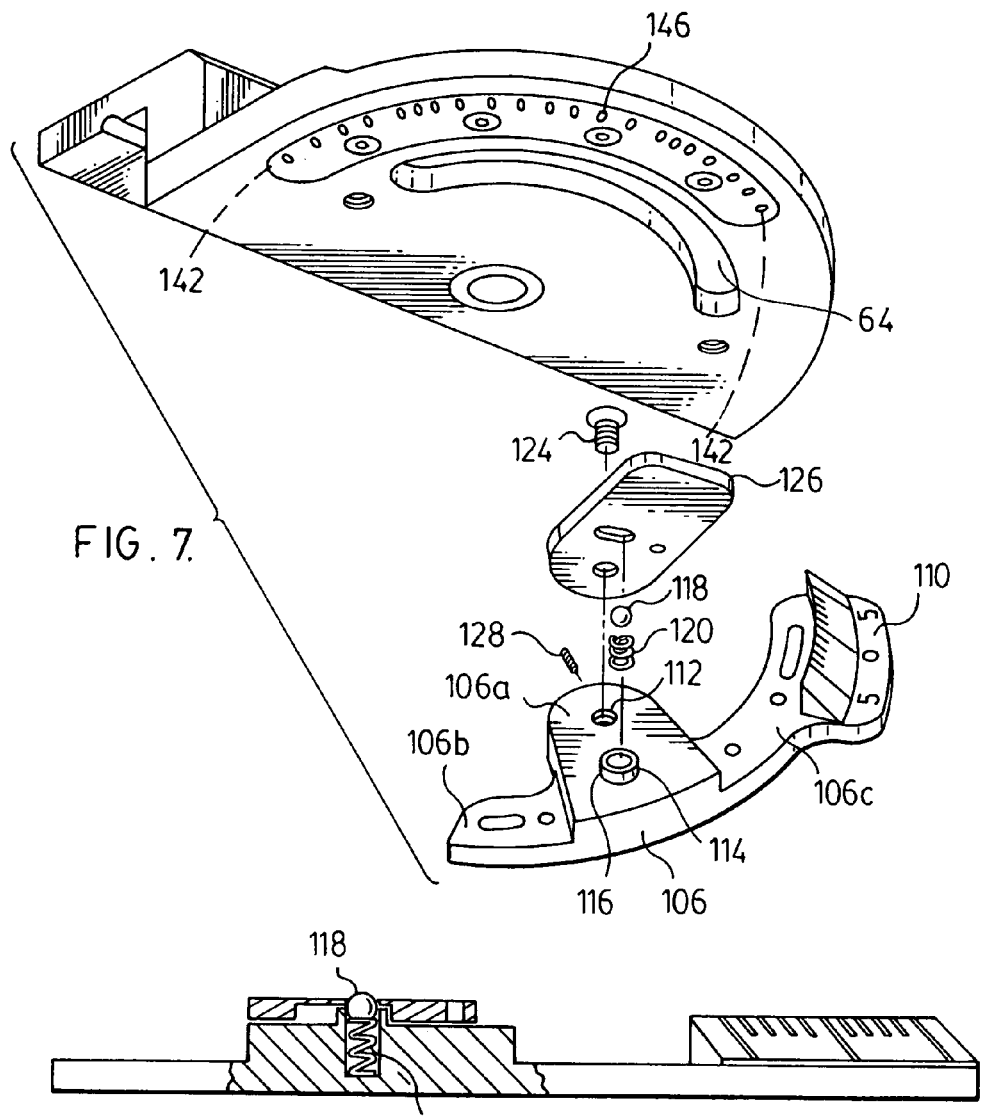
FIG. 7.
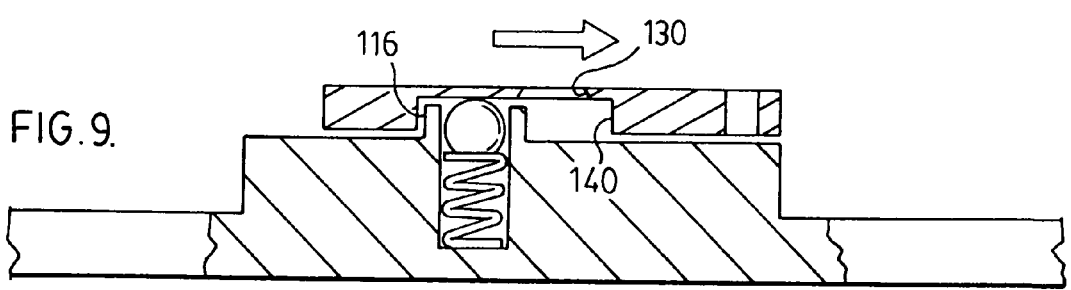
FIG. 8.
FIG. 9.

US 7,255,144 B2

GUIDE FOR WORKBENCH

This Nonprovisional application claims priority under 35 U.S.C. § 119(a) on patent application Ser. No(s). 2,407,368 and 2,437,157 filed in Canada on Oct. 7, 2002 and Aug. 8, 2003, respectively, the entire contents of which are hereby incorporated by reference.

FIELD OF THE INVENTION

This invention relates to a guide for facilitating the adjustment of a piece of stock on a workbench and more particularly to a guide for adjusting the position of a piece of stock on a workbench in order to control the angle of cut into the stock by a power tool. The power tool may be a router, a power saw and the like.

BACKGROUND OF THE INVENTION

A piece of stock which is cut on a workbench usually contacts a fence along one of its sides. Along its oppositely facing side, the stock contacts a guide which serves to control the movement of the stock across the working surface. The guide is usually fitted with a tongue which slides in a groove. The groove conventionally extends laterally across the working surface. By means of the tongue, the stock can travel on a path which is parallel to the groove.

Many problems are encountered in controlling the stock in this manner. For the tongue to move smoothly in the groove, it cannot be too tight-fitting. The looser it is, however, the more subject the tongue is to vibration or oscillation. Such movement causes a like movement of the guide with a resulting loss in precision of the cut made by the power tool. Such movement also causes fatigue since the operator will feel the movement when his hands are on the guide.

Another problem which is frequently encountered is that the stock tends to bind in the cutter of the power tool as the stock is being moved across the working surface. The reason is that the groove in which the tongue of the guide travels is spaced apart from the cutter a significant distance to prevent it from interfering with the cutting operation. The guide, being attached to the tongue, is spaced apart an equal distance. The further the guide is from the point at which the stock is cut, the less effective it is in preventing unintended movement of the stock at that point. Such movement is usually the cause of binding.

A further problem is that as the cutter rotates, it urges the stock away from the fence and toward the guide. Because of the significant spacing between the cutter and the guide, the stock is difficult to control and unintended movement of the stock may occur.

SUMMARY OF THE INVENTION

I have invented a guide for controlling a piece of stock in a way that substantially overcomes these problems. The guide does not move in a groove but moves along a guide rod. Very little if any vibration or oscillation occurs as the guide moves. Moreover, the guide can be moved until it is very close to the cutter. In fact it can be moved over the cutter. Being so close, very little if any unintended movement of the stock occurs as it is being cut.

A further advantage of my guide is that as the stock is being cut, the cutter urges the stock into the fence and not into the guide. Since a fence is stationary during cutting, very little unintended movement of the stock is caused by the cutter.

The guide of my invention controls the angle of stock on a workbench equipped with a fence. Briefly, the guide includes: a base and a slider connected to the base and movable along the fence. A rotary element is mounted for rotation to the base and a backing block is mounted to the rotary element for supporting the stock while it is on the working surface. There is means for releasably clamping the rotary element to the base to prevent the rotary element from rotating relative to the base.

DESCRIPTION OF THE DRAWINGS

The guide is described with reference to the accompanying drawings in which:

FIG. 7 is an exploded perspective view of the lower wall of the rotary plate of FIG. 5 together with an insert attached to the lower wall;

FIG. 8 is an elevation, partly in section, of the insert;

FIG. 9 is a section, in enlarged scale, of a portion of the insert;

Like reference characters refer to like parts throughout the description of the drawings.

DESCRIPTION OF PREFERRED EMBODIMENTS

Figure 1:
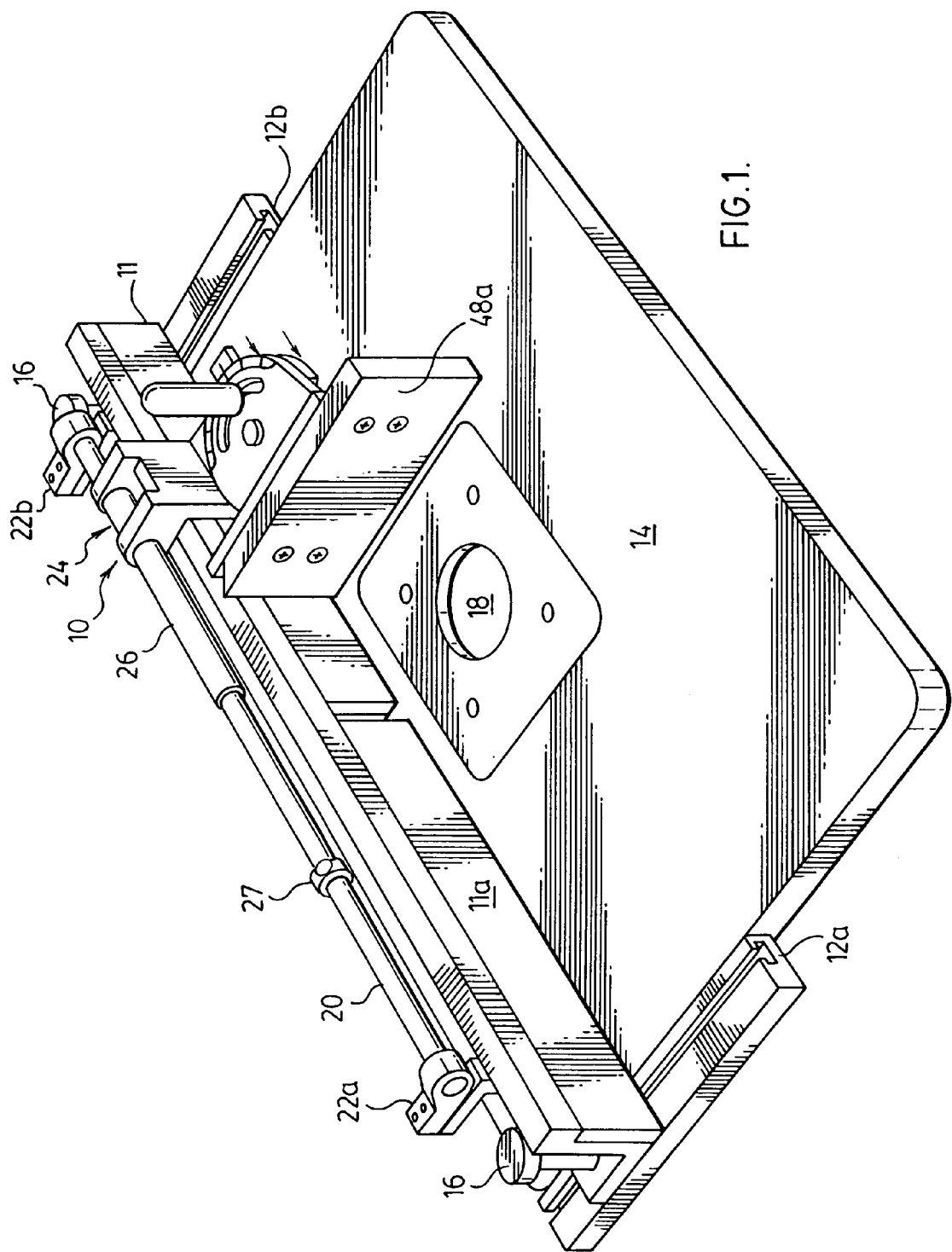
FIG. 1 is a perspective view of the guide in conjunction with a workbench and a fence.
Figure 1A:
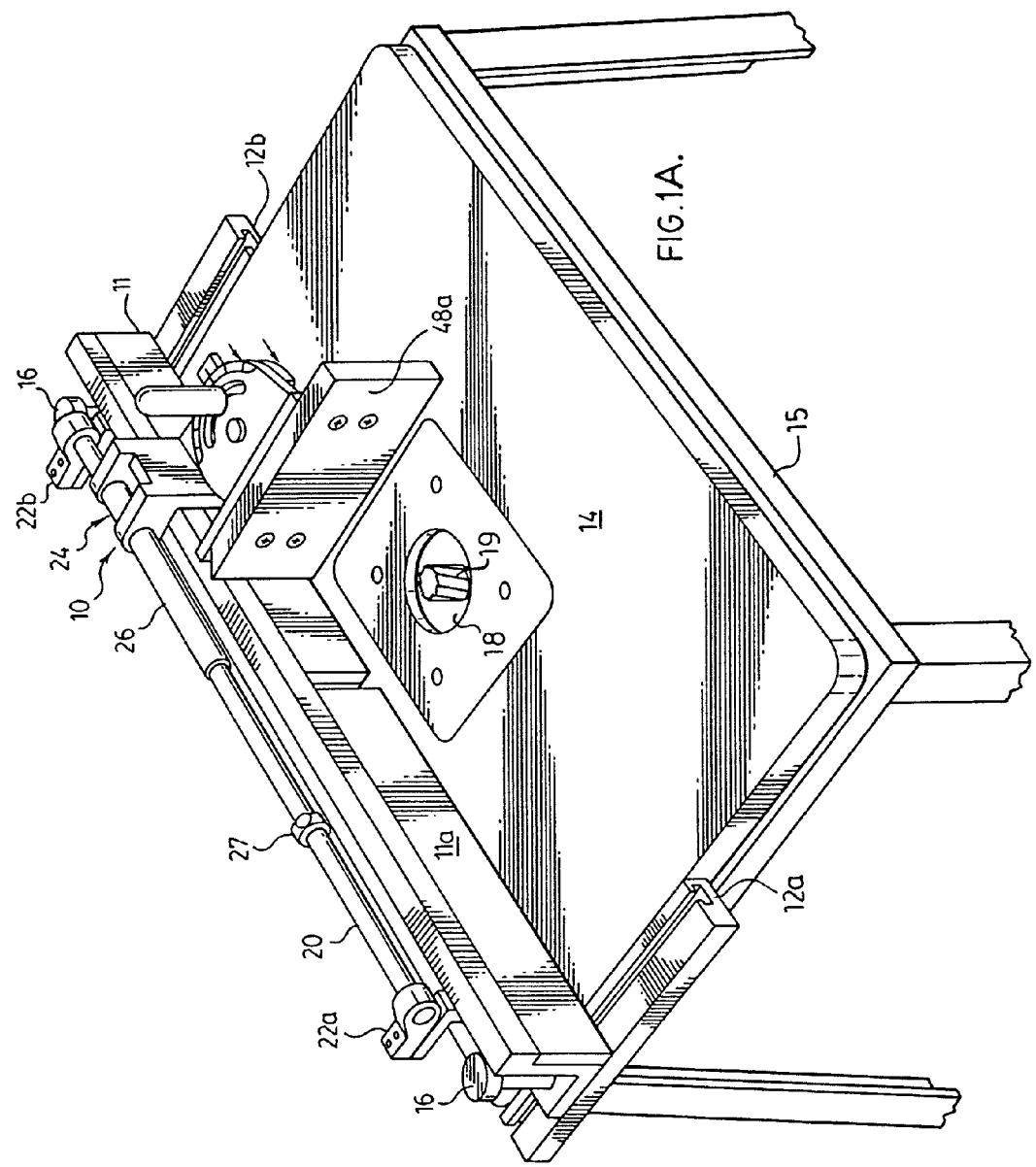
FIG. 1A is identical to FIG. 1 with the exception that a perspective view of a router head and workbench is depicted.
Figure 3:
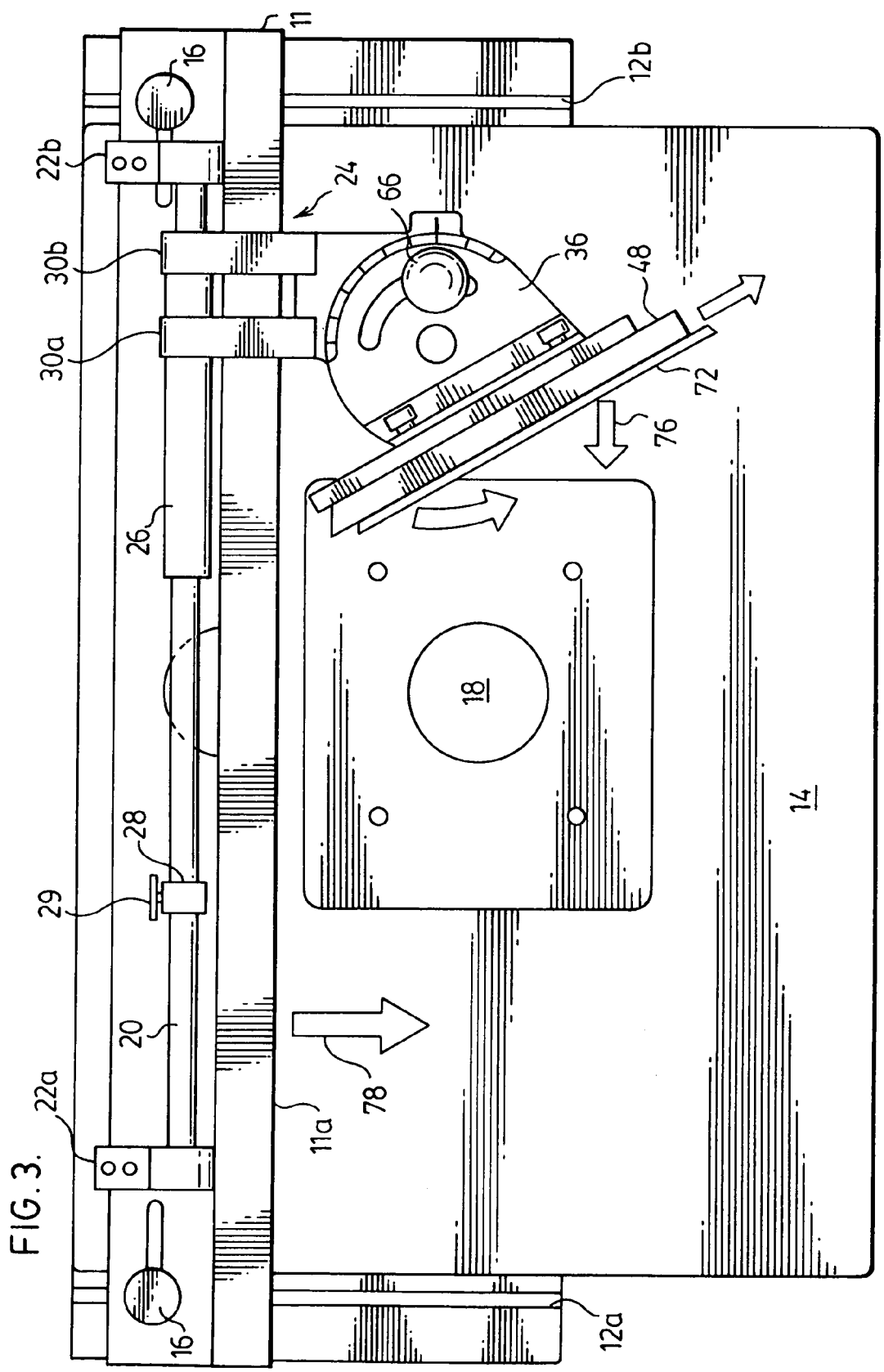
FIG. 3 is a plan view of the guide, workbench and fence.

With reference to FIGS. 1, 1A and 3, the guide of the invention, generally 10, is mounted to a fence 11 which is mounted in grooves 12*a,b* at opposite sides of the working surface 14 of a workbench 15. Knobs 16 at each end of the fence are provided for locking the fence in grooves 12*a,b* so that the fence is stationary. The structure of the fence and the way in which it operates are conventional.

A circular opening 18 is formed in the working surface through which the cutter 19 (FIG. 1A) of a conventional power tool extends. The cutter may be a bit of a router or the blade of a power saw. The power tool, whether a router or a power saw, is mounted beneath the working surface.

A guide rod 20 is supported above the fence by brackets 22*a,b* which are attached to the rear wall of the fence. The guide rod extends horizontally along the length of the fence and supports a slider, generally 24. The slider has a sliding tube 26 having an internal passageway in which the guide rod is received. The sliding tube is freely slidable along the guide rod.

A stop 27 for the slider is mounted for sliding along the guide rod. With reference to FIG. 3, the stop is composed of a ring 28 which encircles the guide rod and an adjusting screw 29 which passes through a threaded opening in the ring and into contact with the guide rod. Tightening of the screw into contact with the rod immobilizes the stop in the conventional manner. The stop serves to limit the length of travel of the slider.

Figure 2:
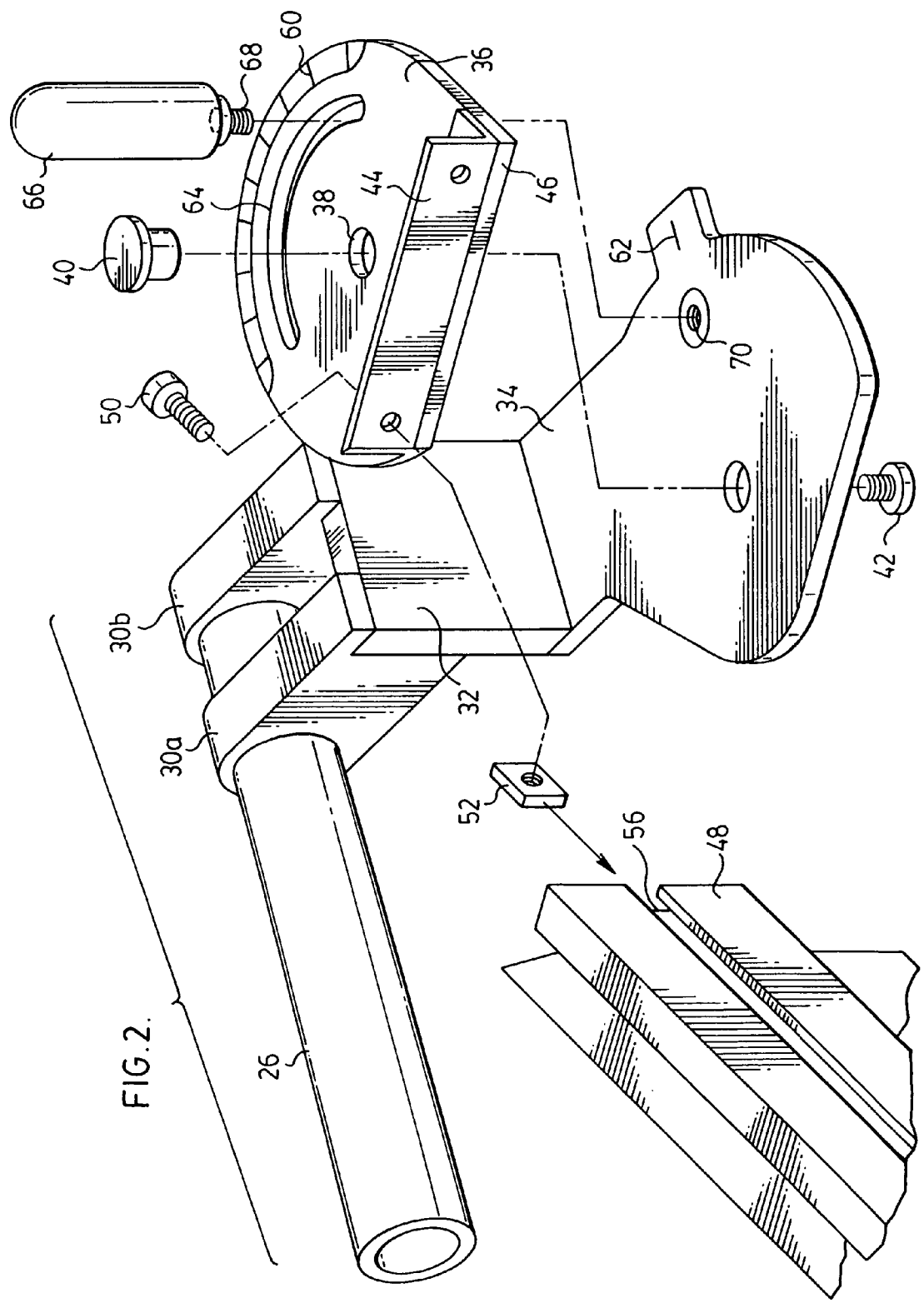
FIG. 2 is an exploded perspective view of the components of the guide.

As illustrated in FIG. 2, the slider has a pair of spaced blocks 30a,b affixed to tube 26. The blocks rest on the upper edge of the fence as the tube slides along the guide rod. The blocks are connected to a side wall 32 which extends vertically downwardly and terminate at a base 34. The base extends horizontally outward from the side wall.

The base supports a rotary plate or element 36. The plate has an outer edge which is curved in part and otherwise is straight 46. The plate has an opening 38 for receipt of a fastener composed of threadably interconnected stud 40 and pin 42. The fastener serves to interconnect the plate and base so that the plate is rotatable relative to the base.

An upstanding rail 44 is attached to the plate adjacent to the straight part of the plate. The rail is connected to a backing block 48 by means of two or more pairs of threadably inter-connected bolts 50 and nuts 52. The nuts are received in a groove 56 in the backing block.

The groove has an interior large enough to allow the nuts to slide freely but the front opening of the groove is constricted so that the nuts cannot pass through the opening. The nuts thus hold the block to the rail but allow the block to slide relative to it. If, however, the studs are tightened to the nuts, the nuts will frictionally engage the walls of the groove which define the opening. The nuts will then prevent the block from sliding.

When the rail is attached to the backing block, the downwardly facing lower wall of base 34 is preferably spaced above the working surface 14 of the workbench. As such, movement of the base will not be impeded by dust, sawdust and chips which collect on the working surface. More preferably, the lower base wall is spaced above the cutter of the power tool so that the cutter will not damage the base when the plate moves over the cutter.

A scale 60 is etched or painted onto the upper surface of the plate adjacent to its curved edge. The scale cooperates with line 62 on the base and acts as a gauge to measure the angle of the plate relative to some line of reference. In FIG. 1, the line of reference is on the plate of the front wall 11a of the fence. Since the plate is connected to the backing block, the gauge serves to measure the angle between the front wall 48a of the block against which the stock is placed, and the front wall 11a of the fence.

An arcuate groove 64 is formed in the plate. A handle 66 has at its lower end a threaded shank 68 which passes through the groove and into a threaded aperture 70 in the base. The handle serves as means for releasably clamping the plate to the base so that the position of the plate on the block is adjustable. Thus, by means of the handle, the piece of stock may be clamped in a fixed angular position relative to the fence.

With reference to FIG. 1, the area of the backing block 48 which the stock contacts and the adjacent area of the front wall 11a of the fence, should the stock slide along the backing block and into contact with the front wall, define "confining walls" for the stock.

The operation of the adjusting guide of the invention is as follows: With reference first to FIG. 3, a piece of stock 72 is shown resting against backing block 48. The angle of the stock is adjusted by loosening handle 66 so that plate 36 can be rotated. Once the stock is in the desired position, the handle is tightened so that the plate is immovable relative to the base. The stock can then be moved laterally in the direction of arrow 76 by applying pressure to the adjusting guide to cause sliding tube 26 to slide along the guide rod in that direction. As the stock moves over opening 18, it is cut by the cutter.

The stock can be moved longitudinally forward in the direction of arrow 78 by loosening knobs 16 to allow the fence to carry the guide forward.

When the cutting operation is complete, the guide can be moved out of the way by lifting handle 66. By so doing, tube 26 of the guide will rotate about rod 20 and the guide will swing over the fence and away from the working surface where it will not hinder any operation being carried out on the surface.

Figure 4:
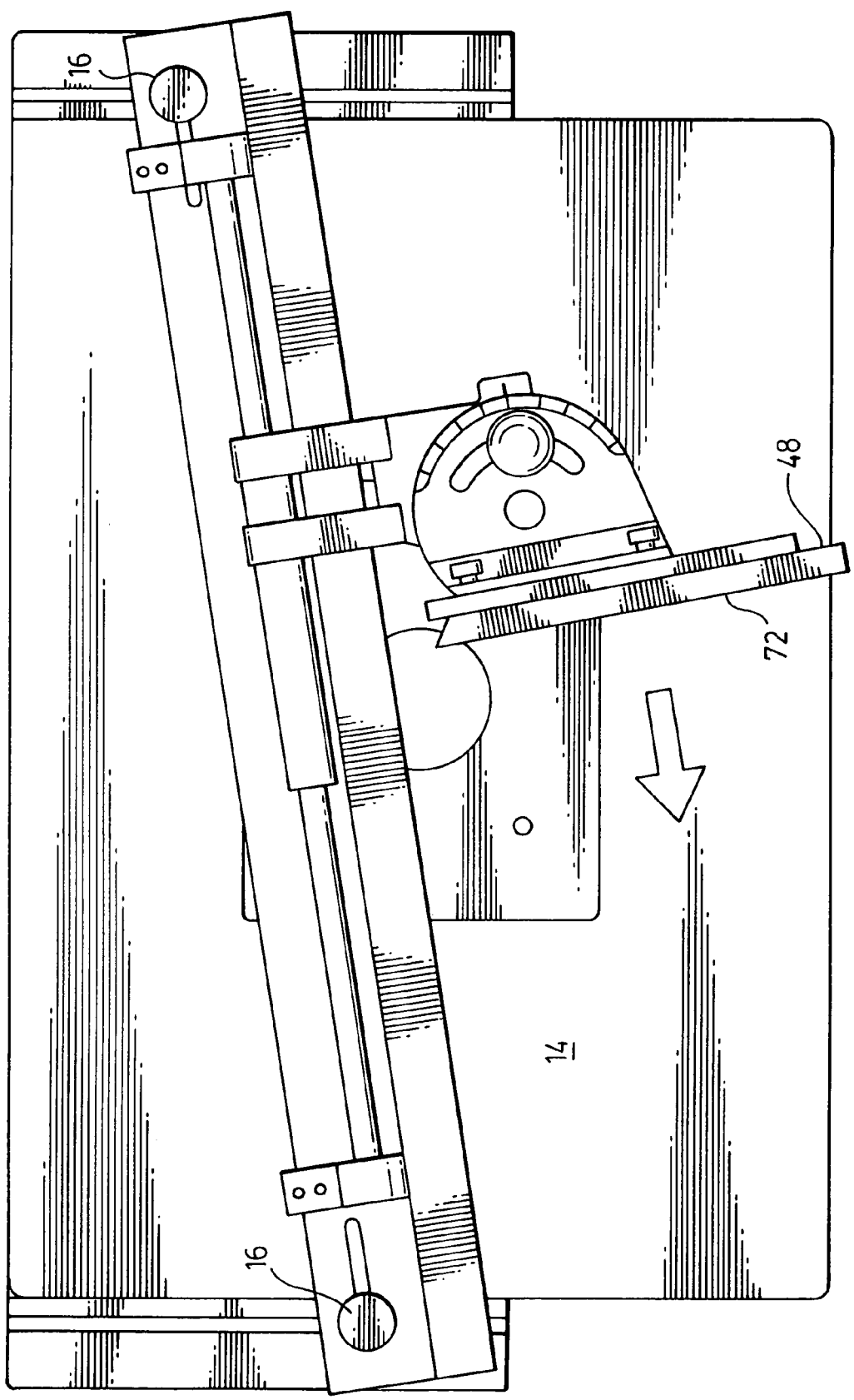
FIG. 4 is another plan view of the same components as in FIG. 3.

With reference to FIG. 4, the angle of the fence can be adjusted by knobs 16 to allow for greater flexibility in the path of the guide.

Figure 5:
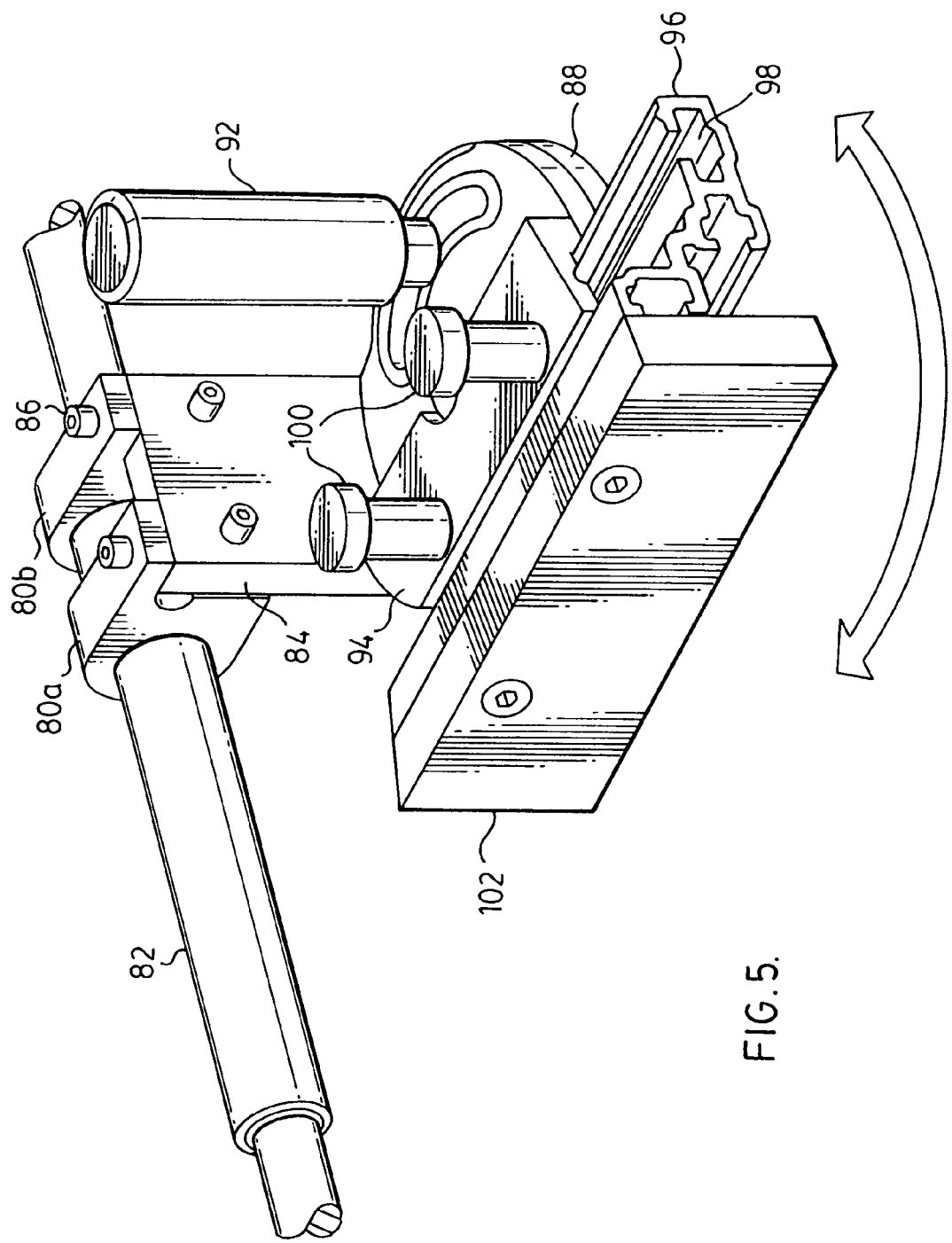
FIG. 5 is a perspective view of a second embodiment of the base and rotary plate.
Figure 6:
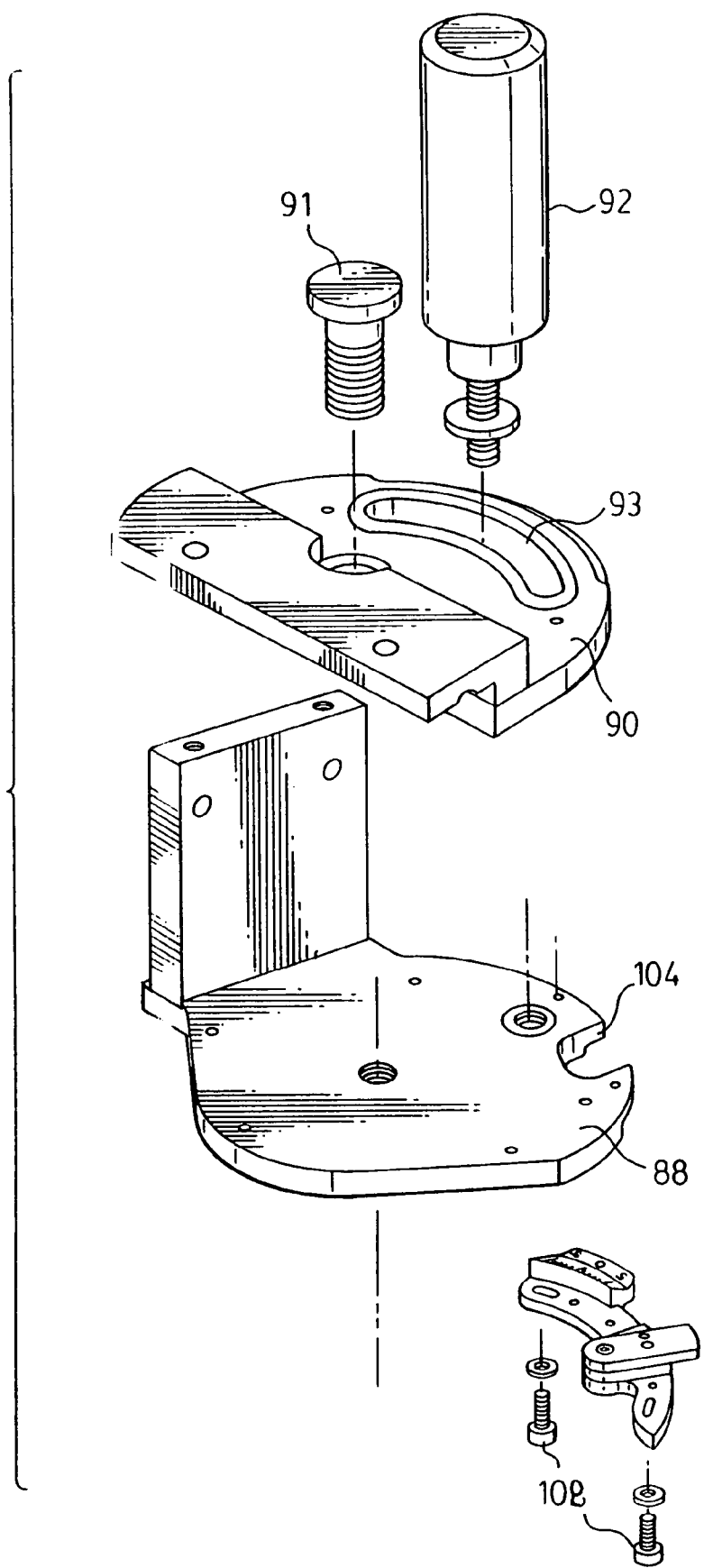
FIG. 6 is an exploded perspective view of the base and rotary plate of FIG. 5.

With reference to FIGS. 5 and 6, blocks 80a,b attached to slider 82 are connected to side wall 84 by means of four socket head cap screws 86. The side wall is connected to base 88 as is rotary plate 90 by means of bolt 91 which allows the plate to swivel on the base. The threaded shank beneath handle 92 travels in arcuate groove 93 in the rotary plate. Rotation of the handle causes the rotary plate to tighten into contact with the base to prevent the plate from swivelling. Handle 66 and groove 64 in the previous drawings serve the same purpose.

Fixed to the upper wall of the rotary plate is a clamp 94. The clamp serves to attach rail 96 to the rotary plate and to prevent it from sliding relative to the plate. It does so by the following means. The rail has a T-slot 98 for sliding receipt of an elongated flat bar (not illustrated). The bar has threaded openings for receipt of threaded stems attached to knobs 100.

Rotation of the knobs in one direction causes the bar to rise into frictional contact with the upper wall of the T-slot and thereby immobilize the rail relative to the rotary plate. Rotation of the knobs in the opposite direction causes the bar to descend thereby allowing the bar to slide in the T-slot.

The rail is bolted to backing block 102. The block is movable in three ways. It is movable forward and back, it swivels clockwise and counterclockwise, and it slides to the right and to the left. The first movement occurs when slider 82 moves on the guide rod as previously described. The second movement occurs when handle 92 is loosened to allow the rotary plate to swivel and the third movement occurs when clamp 94 is loosened.

With reference to FIGS. 6 and 7, base 88 has a generally U-shaped opening 104 in its outer edge for receipt of the raised central area 106a of an insert 106. The two outer areas 106b,c of the insert are inset into the lower wall of the base and each has a slot for receipt of bolts 108 for attachment of the insert to the base. Outer area 106c has a scale 110 which projects beyond the outer edge of the base to permit fine adjustment of the rotary plate.

The central area of the insert has inner and outer holes 112, 114 formed in it. The outer hole has a cylindrical wall defined at the top by a raised annular lip 116. The lower portion of the hole receives a metallic ball or ball bearing 118, and immediately below it, a coil spring 120. The ball rests on the spring and is urged upwardly by the bias of the spring.

The inner hole 112 in the insert has a threaded inner wall for threadable receipt of a threaded pin 124 for pivotally attaching a detent-disengaging plate 126 to the insert. A threaded locking key 128 holds the pin in position.

With reference to FIGS. 8 and 9, plate 126 has a slot 130 which when above the ball as illustrated in FIG. 8, allows the upper wall of the ball to extend above the plate. The edges of the slot are spaced apart less than the diameter of the ball to prevent the spring from pushing the ball upwardly out of the slot.

With reference to FIG. 9, when the detent-engaging plate pivots in the direction of the arrow, the slot is no longer above the ball and the plate forces the ball downward into the opening in the plate. The ball, accordingly, no longer projects above the plate.

A cavity 140 is formed in the lower wall of the plate. The side walls of the cavity engage annular lip 116 when the slot is over the ball as illustrated in FIG. 8 and entirely over the ball as illustrated in FIG. 9. The lip as such acts as stop points for the detent-disengaging plate and ensures that the plate, while free to pivot, never pivots beyond the central area of the insert. Being always over the central area, the plate serves to confine the ball in hole 114.

Figure 10:
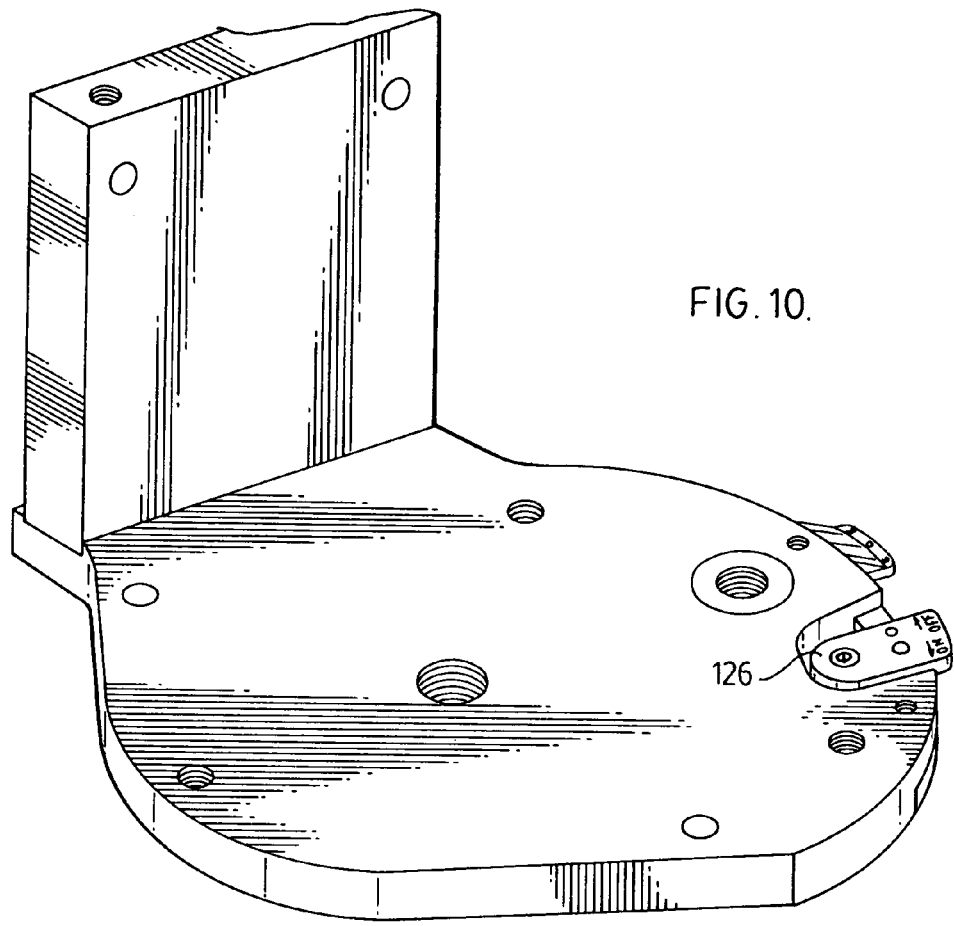
FIG. 10 is a perspective view of the base.

The ball cooperates with the rotary plate and together they act as a detent to cause the rotary plate to swivel in predetermined increments on the base. FIGS. 9-12 illustrate the way in which the ball and plate cooperate in this way. With reference first to FIG. 10, the detent-disengaging plate 126 is marked with the words "on" or "off". Those words indicate when the detent is engaged and when it is disengaged. When engaged, slot 130 is over the ball and the ball projects above the plate 126. When disengaged, the ball is confined below the plate.

Figure 11:
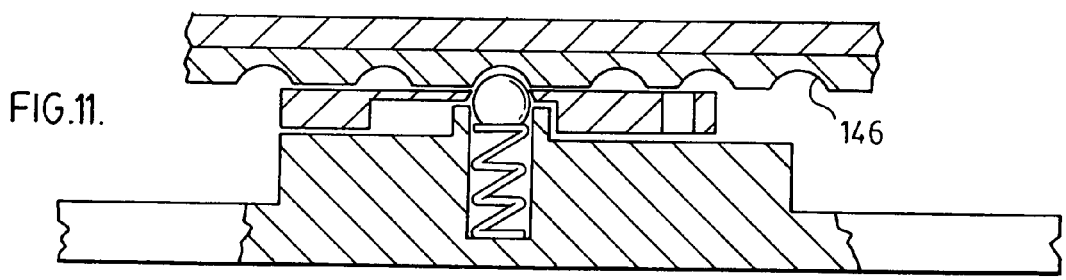
FIG. 11 is a section of the insert and base in which a detent is engaged.

With reference to FIGS. 7 and 11, arranged along an arc-shaped line 142-142 on the lower wall of the rotary plate 90 and spaced radially outwardly from arcuate groove 64 is a number of dome-shaped openings 146. The openings are spaced an equal distance apart from one other.

Figure 12:
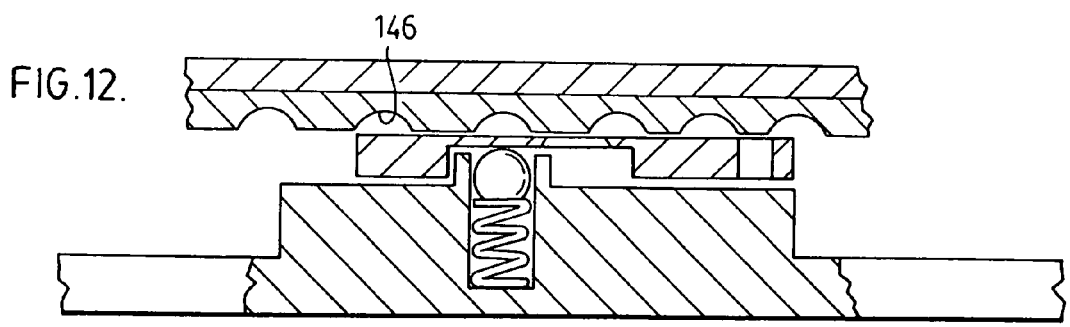
FIG. 12 is another section of the insert and base in which the detent is disengaged.

When the detent is engaged as illustrated in FIG. 11, the ball is received in one of the openings 146. As the rotary plate swivels, the ball rolls out of that opening and rolls into the next on the arc. The ball therefore causes the rotary plate to move in fixed increments since when the ball is between each opening, the plate rolls on the ball and is unstable. The plate will eventually swivel to a point at which the ball finds its way into an opening When the detent is disengaged as illustrated in FIG. 12, the ball is below openings 146 and does not interfere with the movement of the rotary plate. At this time, the position of the rotary plate can be accurately set by means of scale 110. Handle 92 can then be tightened into engagement with the rotary plate in order to hold the plate in the desired position.

It will be understood, of course, that modifications can be made in the structure of the guide which is described herein without departing from the scope of the invention.

I claim:

1. Apparatus for cutting stock on a working surface by means of a router, said apparatus including a fence movable across and relative to said working surface; a guide having a base, a rotary element mounted on and rotatable relative to said base and having a backing block for supporting said stock, said backing block and an adjacent area of said fence defining confining walls adapted to contact said stock as said stock is cut by said router, said confining wall of said supporting block hindering unintended movement of said stock caused by rotation of said router, a guide rod mounted to said fence and to which said guide is slidably and rotatably mounted such that said base is movable relative to said working surface, said guide rod being arranged and constructed to steer said base in a direction, first toward said router with resulting movement of stock supported by said backing block toward and into contact with said router, and secondly, further in the same direction with resulting further movement of said stock in order to cut said stock, the length of said cut corresponding to the length of further movement of said stock.

2. The apparatus of claim 1 wherein said guide rod is movable relative to said working surface, and means for releasably preventing said guide rod from moving.

3. The apparatus of claim 1 further including means for releasably preventing said rotary element from rotating relative to said base.

4. The apparatus of claim 3 further including a slider having a sliding tube provided with an internal passageway in which said guide rod is received, said base being connected to said slider.

5. The apparatus of claim 4 wherein said slider is pivotal relative to said guide rod such that said base can be swung away from said working surface when said backing block is not required to support said stock.

6. The apparatus of claim 1 wherein said backing block is releasably slidable relative to said rotary element.

7. The apparatus of claim 1 wherein said rotary element is no lower than said base and said base has a lower wall which is spaced above said working surface.

8. The apparatus of claim 1 wherein said rotary element has a scale for measuring the angle of the rotary element relative to a given line of reference.

9. The apparatus of claim 4 further including a movable stop for limiting the length of travel of said slider.

10. The apparatus of claim 1 wherein said rotary element is provided with a detent which causes said rotary element to move in predetermined increments as it rotates.

11. The apparatus as claimed in claim 10 further including means for disengaging said detent.

12. The apparatus of claim 1 wherein said base has a scale to permit fine adjustment of said rotary element.

13. The apparatus of claim 10 wherein said detent comprises a ball biased by resilient means into contact with said rotary element, said rotary element having a plurality of openings, each of which being adapted to receive said ball, said ball when received in any one of said openings serving to inhibit the rotation of said rotary element relative to base.

14. The apparatus of claim 13 further including a plate pivotal from a detent-disengaging position in which said plate prevents said ball from entering said openings to a detent-disengaging position in which said ball is free to enter said openings.

15. The apparatus of claim 14 further including a stop on each side of said plate for limiting the extent of pivoting of said plate.

16. The apparatus of claim 1 further including means for altering the angle of said fence on said working surface.

17. The apparatus of claim 1 wherein said router is within said working surface.

* * * * *